United States Patent
Borowicz (10) Patent No.: US 11,103,937 B2
(45) Date of Patent: Aug. 31, 2021

(54) METHODS AND DEVICES FOR MACHINING A CHILLED WORKPIECE

(71) Applicant: The Boeing Company, Chicago, IL (US)

(72) Inventor: Clifford D. Borowicz, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 16/289,240

(22) Filed: Feb. 28, 2019

(65) Prior Publication Data

US 2020/0276655 A1     Sep. 3, 2020

(51) Int. Cl.
*B23C 3/00*     (2006.01)
*B23Q 11/00*     (2006.01)
(Continued)

(52) U.S. Cl.
CPC .............. *B23C 3/13* (2013.01); *B23C 3/22* (2013.01); *B23Q 11/10* (2013.01); *B23Q 11/126* (2013.01);
(Continued)

(58) Field of Classification Search
CPC ....... B23C 3/13; B23Q 11/126; B23Q 11/141; B23Q 11/10; Y10T 409/304032
See application file for complete search history.

(56) References Cited

U.S. PATENT DOCUMENTS

| 4,445,956 A | 5/1984 | Freeman et al. |
| 4,685,660 A | 8/1987 | Dillner |

(Continued)

FOREIGN PATENT DOCUMENTS

| CN | 106964993 | 7/2017 | |
| EP | 3056305 A1 * | 8/2016 | ............. B32B 3/266 |

(Continued)

OTHER PUBLICATIONS

Machine translation to English of EP 3 056 305 A, 12 pages, Aug. 17, 2016 published. (Year: 2016).*

(Continued)

*Primary Examiner* — Linda L Gray
(74) *Attorney, Agent, or Firm* — Dascenzo Gates Intellectual Property Law, P.C.

(57) ABSTRACT

Machining apparatus for machining a chilled workpiece include a support surface that supports the chilled workpiece during machining by a machining tool of the machining apparatus, and further include a cooling system operatively coupled to the support surface. The cooling system prevents a machining temperature of an adhesive coupled to the chilled workpiece from rising beyond a predetermined threshold temperature during machining of the chilled workpiece, such that the cooling system prevents curing of the adhesive during machining of the chilled workpiece. The cooling system includes a cooling fluid that radiantly cools the chilled workpiece via the support surface while the chilled workpiece is supported by the support surface, such that the cooling system maintains the machining temperature of the adhesive (and of the chilled workpiece) below an ambient temperature. Related methods include machining the chilled workpiece using such machining apparatus.

20 Claims, 4 Drawing Sheets

(51) Int. Cl.
*B23C 3/13* (2006.01)
*B23C 3/22* (2006.01)
*B23Q 11/12* (2006.01)
*B23Q 11/10* (2006.01)
*B23Q 11/14* (2006.01)

(52) U.S. Cl.
CPC ....... *B23Q 11/141* (2013.01); *Y10T 156/1075* (2015.01)

(56) References Cited

U.S. PATENT DOCUMENTS

| | | | |
|---|---|---|---|
| 2003/0152432 A1* | 8/2003 | Meece | B23C 3/00 409/132 |
| 2005/0173380 A1 | 8/2005 | Carbone | |
| 2005/0196941 A1* | 9/2005 | Park | H01L 21/78 438/462 |
| 2019/0168380 A1* | 6/2019 | Morimura | B25J 15/0019 |

FOREIGN PATENT DOCUMENTS

| | | |
|---|---|---|
| KR | 20160079313 | 7/2016 |
| WO | WO 87/07863 | 12/1987 |

OTHER PUBLICATIONS

European Patent Office, Extended European Search Report for related European Patent Application No. 20159472, dated Jul. 14, 2020.

Machine-generated English translation of the abstract of KR 20160079313, downloaded from Espacenet.com on Aug. 7, 2020.

Machine-generated English language translation of the abstract of CN 106964993, downloaded from Espcenet.com on Sep. 25, 2020.

* cited by examiner

FIG. 4 ns and Devices for Machining
METHODS AND DEVICES FOR MACHINING A CHILLED WORKPIECE

FIELD

The present disclosure relates to methods and devices for machining a chilled workpiece.

BACKGROUND

In the process of manufacturing large assemblies, such as aircraft wing assemblies, often when two or more parts are brought together, gaps may be present where the parts do not engage perfectly. Such gaps may form as a result of accumulation of small errors throughout the manufacturing process. To address these gaps and ensure a proper fit between the parts, material is used to fill in the gaps. Such filler material is often referred to as "shims," with the shims being cut to shape to fill the particular needs of each part or assembly. In one conventional technique for producing these shims, a moldable plastic shim is adhered within the gap, though these moldable plastic shims are messy, as well as time-consuming in terms of application time, cleaning time, and cure time. Other techniques for producing shims have attempted to use film adhesives to bond a sacrificial material to the part or assembly, to reduce the mess and clean-up often involved with the use of moldable plastic shims. However, suitable film adhesives generally need to be kept chilled, and thus are cut to size separately from the sacrificial material. In other words, for a given shim, the same profile is cut twice—once to produce the correct size and shape in the film adhesive, and once to produce the correct size and shape in the sacrificial material. The cut film adhesive is then used to apply the sacrificial material of the same size and shape to the assembly. This process is also time-consuming, and prone to introduction of additional errors in manufacturing due to requiring that each profile be cut twice in separate materials.

SUMMARY

Disclosed machining apparatus, systems, and methods may enable a film adhesive and a chilled workpiece to be cut or otherwise machined together (e.g., simultaneously), thus reducing manufacturing costs and time, as compared to conventional techniques. Such methods and apparatus may advantageously cool the workpiece and adhesive, without requiring an HVAC system to cool the entire environment in which the machining apparatus and workpiece are located. Such methods and apparatus may additionally reduce waste in manufacturing processes, and reduce the need to store materials while not in use, because material may be processed as needed, just prior to application to a structure of an assembly. Whereas conventional methods often involve applying adhesive to individual pieces of sacrificial material, disclosed methods may be automated, with the adhesive applied as a sheet or film, as opposed to having to shape and cut the adhesive and then apply the cut shapes to the assembly structure individually. Such disclosed methods and apparatus may be applied to any manufacturing process where filler material is bonded onto a substructure. In a specific example, disclosed methods and apparatus may be used in the manufacture of aircraft wing assemblies, such as on shimless wing manufacturing techniques, or predictive shimming manufacturing techniques.

An exemplary disclosed machining apparatus includes a machining tool for machining a chilled workpiece, a support surface for supporting the chilled workpiece during machining by the machining tool, and a cooling system operatively coupled to the support surface. The cooling system is configured to prevent a machining temperature of an adhesive coupled to the chilled workpiece from rising beyond a predetermined threshold temperature during machining of the chilled workpiece. The cooling system thus prevents curing of the adhesive during machining of the chilled workpiece. The cooling system may include a cooling fluid that radiantly cools the chilled workpiece via the support surface while the chilled workpiece is supported by the support surface. Such cooling systems generally maintain the machining temperature of the chilled workpiece below ambient temperature. The machining tool may be numerically controlled. Disclosed systems include such machining apparatus and the chilled workpiece. In some examples, the chilled workpiece is, or includes, a sheet material having a first surface and a second surface, with the adhesive coupled to the first surface and/or the second surface. The adhesive is generally a temperature-sensitive film adhesive that cures at a known temperature, or within a known temperature range. The chilled workpiece is thus generally chilled to a temperature below the curing temperature of the adhesive (or below the lowest temperature of the curing temperature range). Further, during machining, the chilled workpiece (which includes the adhesive) is kept below the curing temperature (or range of temperatures) of the adhesive.

Disclosed methods include positioning a chilled workpiece such that it is supported by a support surface of a machining apparatus, machining the chilled workpiece with a machining tool of the machining apparatus, and preventing the machining temperature of the adhesive on the chilled workpiece from rising above a predetermined threshold temperature during the machining of the chilled workpiece. The predetermined threshold temperature generally is at least partially determined by the curing temperature of the adhesive (e.g., the predetermined threshold temperature is lower than the curing temperature of the adhesive). In such methods, the support surface supports the chilled workpiece during machining, and a cooling system of the machining apparatus maintains the temperature of the chilled workpiece below the predetermined threshold temperature during machining, via the support surface. For example, the cooling system may radiantly cool the support surface and the chilled workpiece by flowing cooling fluid through or under the support surface. The cooling system thus prevents curing of the adhesive during the machining of the chilled workpiece.

DESCRIPTION

Apparatus and methods for machining workpieces while chilling the workpieces are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a given example without departing from the scope of the present disclosure.

Figure 1:
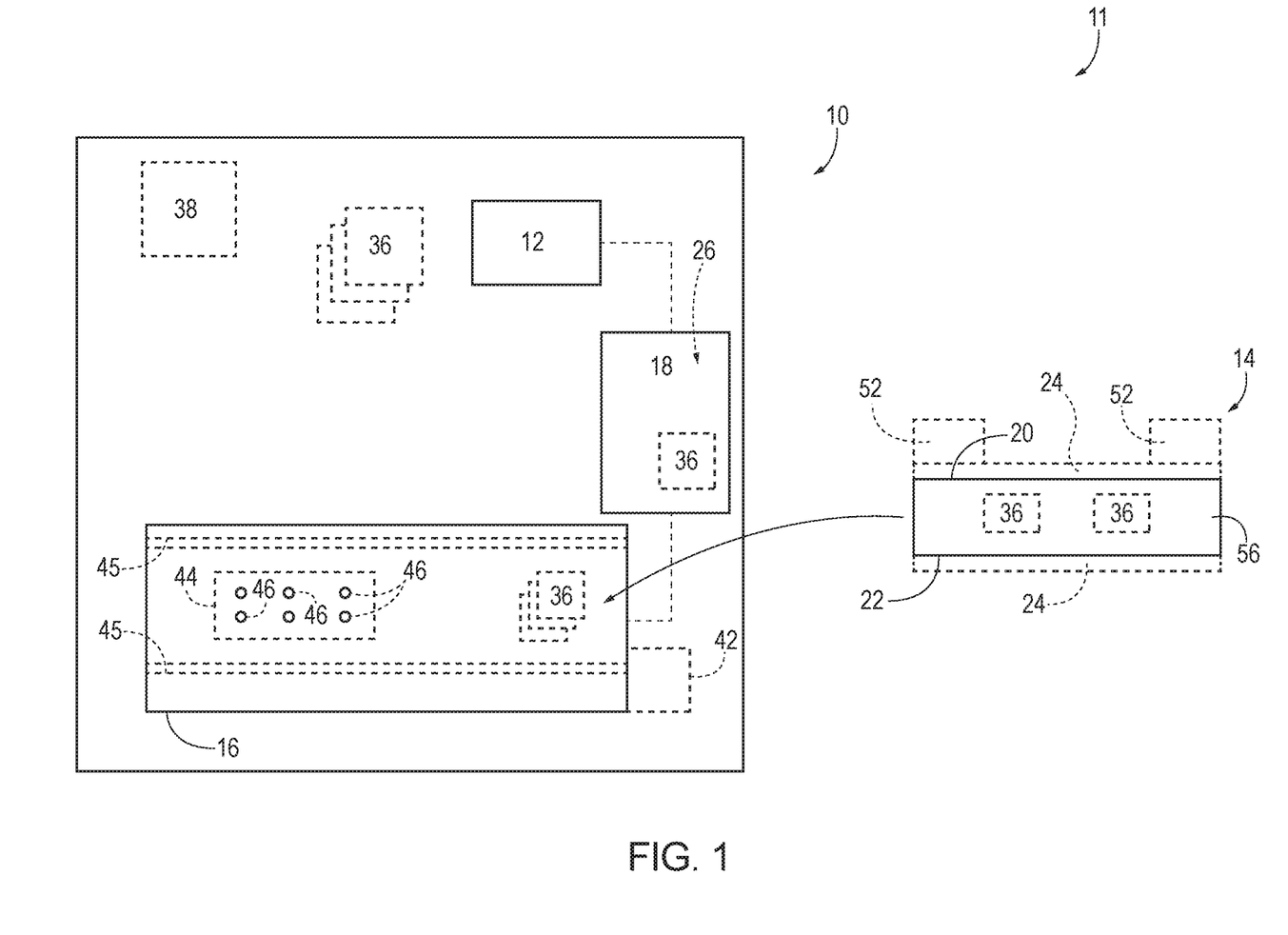
FIG. 1 is a schematic representation illustrating examples of systems and machining apparatus according to the present disclosure.

FIG. 1 schematically illustrates examples of machining apparatus 10 and systems 11 according to the present disclosure. Systems 11 generally include machining apparatus 10 and a chilled workpiece 14 to be machined by machining apparatus 10. Machining apparatus 10 generally includes a machining tool 12 for machining a chilled workpiece 14, a support surface 16 for supporting chilled workpiece 14 during machining, and a cooling system 18 operatively coupled to support surface 16. Chilled workpiece 14 includes a first surface 20 and a second surface 22, with second surface 22 being opposite first surface 20. A temperature-sensitive adhesive 24 is adhered to first surface 20 and/or second surface 22. In some examples, adhesive 24 may be present on both at least a portion of first surface 20 and at least a portion of second surface 22. In some examples, adhesive 24 may be present over substantially the entire first surface 20. Additionally or alternatively, adhesive 24 may be present over substantially the entire second surface 22. Adhesive 24 is generally configured to adhere chilled workpiece 14 to another structure by curing adhesive 24 at its curing temperature. As used herein, a "curing temperature" is understood to include a range of temperatures within which the adhesive is configured to cure. Any of first surface 20 and/or second surface 22 that includes adhesive 24 may be referred as an adhesive side of chilled workpiece 14, and similarly, any of first surface 20 or second surface 22 that does not include adhesive 24 may be referred to as a non-adhesive side of chilled workpiece 14. Chilled workpiece 14 may be supported by support surface 16 such that an adhesive side of chilled workpiece 14 faces and is supported by support surface 16. In other examples, chilled workplace 14 may be supported by support surface 16 such that a non-adhesive side of chilled workpiece 14 faces and is supported by support surface 16.

Cooling system 18 prevents a machining temperature of adhesive 24 (i.e., the temperature of the chilled workpiece 14 and/or adhesive 24 during machining) from rising beyond a predetermined threshold temperature. In this manner, cooling system 18 prevents curing of adhesive 24 during machining of chilled workpiece 14. Cooling system 18 includes a cooling fluid 26 that radiantly cools chilled workpiece 14 and adhesive 24 via support surface 16, while chilled workpiece 14 is supported by support surface 16. Chilled workpiece 14 is generally cooled, or chilled, prior to application of adhesive 24 to chilled workpiece 14, to prevent curing of adhesive 24. Cooling system 18 thus maintains a reduced temperature of chilled workpiece 14, as compared to ambient temperature. In other words, cooling system 18 keeps chilled workpiece 14 at a temperature lower than the ambient temperature in the environment or location where machining apparatus 10 and chilled workpiece 14 are located, as well as keeps chilled workpiece 14 at a temperature lower than the curing temperature of adhesive 24, while chilled workpiece 14 is machined by machining apparatus 10. In some examples, cooling system 18 is configured to maintain a temperature of a workpiece that has been previously cooled, such as by cold storage. Additionally or alternatively, cooling system 18 may be configured to lower the temperature of chilled workpiece 14 and adhesive 24 to a temperature lower than the temperature of chilled workpiece 14 when it was positioned with respect to support surface 16.

Support surface 16 is generally positioned underneath chilled workpiece 14 in order provide support, though in some examples chilled workpiece 14 may be mounted or otherwise supported by support surface 16 in other orientations. For example, chilled workpiece 14 may be vertically mounted on support surface 16. In any arrangement, support surface 16 may be said to support chilled workpiece 14 when chilled workpiece 14 is arranged with respect to support surface 16 such that support surface 16 positions and supports chilled workpiece 14 during machining by machining apparatus 10. In some examples, one or more layers of material or structures may be present between chilled workpiece 14 and support surface 16 while chilled workpiece 14 is supported by support surface 16. In one specific example, support surface 16 may be a mill table of a milling machine (which is an example of machining apparatus 10), with chilled workpiece 14 resting on and/or secured with respect to the mill table during milling.

Machining apparatus 10 may be configured to perform any desired operation or manipulation on chilled workpiece 14. For example, machining apparatus 10 may be configured to perform cutting, milling, drilling, turning, trimming, facing, smoothing, grinding, broaching, honing, reaming, shaping, threading, tapping, boring, planing, and/or any other machining operations on chilled workpiece 14. As used herein, the term "cutting" includes scoring, profiling, cutting all the way through one layer, cutting all the way through two or more layers, cutting partially through one or more layers, machining, milling, or otherwise removing material from a workpiece, such as to define the shape, size, profile, and/or contours of the workpiece. While machining apparatus 10 may be configured for performing such operations traditionally considered to be "machining," in some examples, such apparatus 10 may be configured for other operations or manipulations, in addition or alternatively to, the operations and manipulations described above. As used herein, the term "machining" includes any desired operation or manipulation performed on chilled workpiece 14. For example, machining apparatus 10 may be configured to hold and secure chilled workpiece 14 while cooling system 18 prevents the adhesive 24 from curing during painting, routing, sanding, welding, assembling, fabrication, build-up, lay-up, bonding, marking, testing, inspecting, scanning, repairing, blasting, embossing, metalizing, printing, soldering, manipulation by a robotic end effector, and/or any other manufacturing process, operation, or manipulation performed on chilled workpiece 14.

To this end, machining tool 12 may be any appropriate tool for the desired operation of machining apparatus 10. Machining tool 12 may be, for example, a cutting mechanism, such as a laser cutter, a water jet cutter, a blade cutter, and/or a liquid Nitrogen jet cutter. In examples where machining tool 12 is a cutting mechanism, said cutting mechanism may include a cryogenic cooling fluid and/or a cryogenic cutter. In other illustrative examples, machining tool 12 may include a broaching machine, a drill, a hone, a lathe, a mill, a shaper, a planer, a grinding machine, a multitasking machine tool, a welding head, a laser welder, and/or a paint spray gun. Machining tool 12 is automated and/or numerically controlled in some examples.

In some examples, cooling system 18 enables temperature controlled machining operations by machining apparatus 10. In other words, cooling system 18 may be configured to selectively increase or decrease the temperature of chilled workpiece 14 and/or support surface 16. For example, cooling system 18 may be configured to reduce the temperature of chilled workpiece 14 during selected operations or times during a given machining operation, and may be configured to proactively raise the temperature and/or passively allow the temperature to increase during other times or operations in the machining process. Such changes in temperature may be programmed, or automated, such that they occur without additional input from operators or technicians. Additionally or alternatively, such selective temperature changes may be effectuated manually during the machining operation.

Cooling fluid 26 of cooling system 18 may radiantly cool support surface 16 and chilled workpiece 14, by placement and/or motion of cooling fluid 26 with respect to support surface 16. For example, cooling fluid 26 may be flowed through or under support surface 16, such as through one or more fluid channels 45. Said fluid channels 45 are positioned relative to support surface 16 such that cooling fluid 26 in fluid channels 45 cools support surface 16 and any chilled workpiece 14 supported by support surface 16. Such fluid channels 45 may be embedded within support surface 16, positioned underneath support surface 16, and/or otherwise positioned within machining apparatus 10 to cool support surface 16. Additionally or alternatively, cooling fluid 26 may form a liquid bath in which support surface 16 rests, or is in contact. In a specific example, cooling fluid 26 may flow through a CNC mill table to cool a chilled workpiece placed on the CNC mill table. Cooling fluid 26 may be any suitable fluid, such as a refrigerant, water, or liquid nitrogen.

Figure 2:
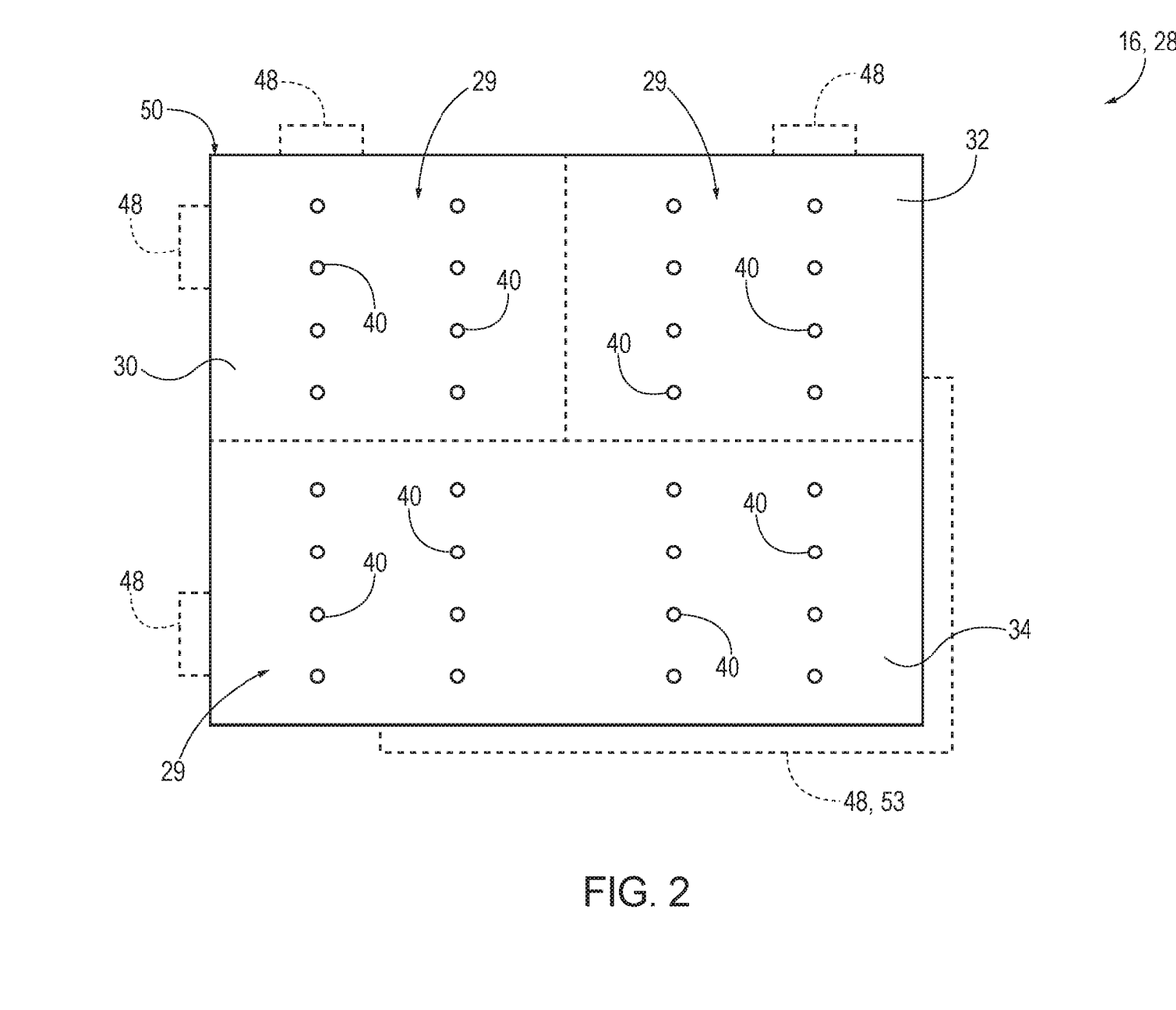
FIG. 2 is a schematic plan view of a support surface of a machining apparatus according to the present disclosure.

In some examples, cooling system 18 is configured to control one or more different zones 29, or areas, of support surface 16 independently of one another. As an illustrative example, FIG. 2 shows a schematic plan view of a support surface 28, which is an example of support surface 16. Support surface 28 includes a first zone 30, a second zone 32, and a third zone 34, all of which are examples of zones 29. A cooling system 18 (FIG. 1) operatively coupled to support surface 28 may be configured to independently control first zone 30, second zone 32, and third zone 34, such that cooling system 18 may selectively increase or decrease the temperature of support surface 28 in first zone 30, while leaving the temperature in second zone 32 and/or third zone 34 substantially unchanged. Similarly, cooling system 18 may be configured to selectively increase or decrease the temperature any of zones 30, 32, 34 (including a subset of said zones 29). While support surface 28 is illustrated with three such zones 29, other examples of support surface 16 may include fewer or more independently controlled zones 29. Further, said independently controlled zones 29 may be similarly sized and shaped within a given support surface 16, or one or more zones 29 may be differently sized and/or shaped from one or more other zones 29 within a given support surface 16. Said independent control of one or more individual zones 29 within a given support surface 16 may be automated, or may be effectuated manually during the machining operation.

Additionally or alternatively, with reference again to FIG. 1, machining apparatus 10 may include one or more temperature sensors 36 configured to provide temperature information feedback during machining of chilled workplace 14. Temperature sensors 36 may include any form of temperature sensors, such as thermocouples, thermistors, thermometers, resistance thermometers, semiconductor-based sensors, and/or temperature probes. Cooling system 18 may be configured to selectively increase or decrease the temperature of support surface 16 (and thereby the temperature of chilled workpiece 14) in response to feedback from one or more such temperature sensors 36. For example, cooling system 18 may be configured to keep support surface 16 and/or chilled workpiece 14 at or below a predetermined threshold temperature (which also includes a predetermined range of temperatures) during machining of chilled workpiece 14. If one or more temperature sensors 36 detect a temperature above the predetermined threshold temperature, then cooling system 18 may reduce the temperature of support surface 16 and chilled workpiece 14, such as by increasing the flow of cooling fluid 26 and/or decreasing the temperature of cooling fluid 26, in response to the temperature data (e.g., feedback) received from one or more temperature sensors 36. Similarly, cooling system 18 may be configured to selectively increase the temperature of support surface 16 and chilled workpiece (e.g., by reducing the flow of cooling fluid 26 or increasing the temperature of cooling fluid 26), in response to feedback from one or more temperature sensors 36.

Said temperature sensors 36 are operatively coupled to support surface 16 and/or chilled workpiece 14. For example one or more temperature sensors 36 may be embedded within support surface 16 and/or embedded within chilled workpiece 14. Additionally or alternatively, one or more temperature sensors 36 may be coupled to chilled workpiece 14 (and/or to support surface 16), such as by being in contact with chilled workpiece 14 (and/or support surface 16). In some examples, temperature sensors 36 may be non-contact temperature sensors that are configured to measure the temperature of support surface 16 and/or chilled workpiece 14 without contacting the same. For example, one or more temperature sensors 36 may be positioned to be spaced apart from support surface 16 and/or chilled workpiece 14. In some examples, one or more temperature sensors 36 may be positioned within one or more fluid channels 45 of cooling system 18.

Adhesive 24 is a temperature-sensitive film adhesive in some examples (e.g., a thermoset or thermoplastic adhesive). Adhesive 24 may be configured to cure at or within any of a range of different temperatures. In some examples, adhesive 24 cures at room temperature. In some examples, adhesive 24 cures at a curing temperature below room temperature. In examples utilizing an adhesive 24 that cures below room temperature, such adhesive may be said to be configured for cold storage, and thus stored in cold storage until use. In some examples, adhesive 24 cures at a curing temperature above room temperature. For example, adhesive 24 may cure at a curing temperature of, or within a range of curing temperatures that spans, at least 80° F., at least 90° F., at least 100° F., at least 110° F., at least 120° F., at least 130° F., at least 140° F., at least 150° F., at least 160° F., at least 170° F., at least 180° F., at least 190° F., and/or at least 200° F. In some examples, adhesive 24 is configured to cure at a temperature or within a temperature range below 80° F., at a temperature or range between 80° F. and 100° F., at a temperature or range between 100° F. and 120° F., at a temperature or range between 120° F. and 140° F., at a temperature or range between 140° F. and 160° F., or at a temperature or range between 160° F. and 180° F. Examples of adhesive 24 include, but are not limited to, polycarbonate film adhesive, epoxy film adhesive, cyanate ester film adhesive, polyimide film adhesive, bismaleimide film adhesive, and/or phenolic film adhesive. Suitable film adhesives may be obtained from, for example, Hexcel (Stamford, Conn., US), Renegade Materials Corp. (Miamisburg, Ohio, US), Magnolia Advanced Materials Inc. (Atlanta, Ga., US), or Cytec Solvay Group (Woodland Park, N.J., US).

Cooling system 18 is configured to keep chilled workpiece 14 below a predetermined threshold temperature during machining of chilled workpiece 14, with said predetermined threshold temperature generally being lower than the ambient temperature and lower than the curing temperature of adhesive 24. The predetermined threshold temperature is, in various examples, at least 10 degrees below the curing temperature of the adhesive, at least 20 degrees below the curing temperature, at least 30 degrees below the curing temperature, at least 40 degrees below the curing temperature, at least 50 degrees below the curing temperature, at least 60 degrees below the curing temperature, at least 70 degrees below the curing temperature, at least 80 degrees below the curing temperature, at least 90 degrees below the curing temperature, and/or at least 100 degrees below the curing temperature. Additionally or alternatively, machining apparatus 10 may be configured to keep chilled workpiece 14 below a temperature of 150° F., 140° F., 130° F., 120° F., 110° F., 100° F., 90° F., 80° F., 70° F., 60° F., 50° F., 40° F., and/or 30° F. during machining of chilled workpiece 14.

Some examples of machining apparatus 10 include a vacuum system 38. Said vacuum system 38 may be operatively coupled to support surface 16 such that vacuum system 38 secures chilled workpiece 14 with respect to support surface 16 while chilled workpiece 14 is supported by support surface 16, and during machining of chilled workpiece 14. For example, support surface 16 may include a plurality of perforations 40 (illustrated in FIG. 2) through which a vacuum may be drawn by vacuum system 38, thereby drawing chilled workpiece 14 towards support surface 16 when chilled workpiece 14 is placed over perforations 40. Additionally or alternatively, some examples of machining apparatus 10 include a mechanical clamping mechanism 42 to secure chilled workpiece 14 with respect to support surface 16 during machining of chilled workpiece 14.

In some examples, chilled workpiece 14 includes one or more tabs 48 positioned around a perimeter 50 of chilled workpiece 14, as seen in FIG. 2. Said tabs 48 may be any size or shape, and may take the form of a plurality of tabs 48 spaced apart from one another. In other examples, tab 48 may form a continuous ridge or rim 53 around at least a portion of perimeter 50 of chilled workpiece 14. Tabs 48 are selectively removable from chilled workpiece 14 and thus may serve to secure chilled workpiece 14 to support surface 16 and then be removed after machining of chilled workpiece 14. For example, clamping mechanism 42 may engage tabs 48 to secure chilled workpiece 14 during machining.

With reference again to FIG. 1, while chilled workpiece is positioned directly on support surface 16 in some examples, some machining apparatus 10 may include one or more structures or layers positioned between chilled workpiece 14 and support surface 16. For example, a layer of thermal conductive sacrificial material 44 may be positioned between support surface 16 and chilled workpiece 14 when chilled workpiece 14 is supported by support surface 16. Such thermal conductive sacrificial material 44 is configured to be thermally conductive such that cooling effects from cooling system 18 are transmitted through thermal conductive sacrificial material 44 to cool chilled workpiece 14 when chilled workpiece 14 is positioned on thermal conductive sacrificial material 44. Additionally, such thermal conductive sacrificial material 44 may be configured to protect support surface 16 during machining of chilled workpiece 14. For example, in examples where machining apparatus 10 is configured to cut chilled workpiece 14, thermal conductive sacrificial material 44 may protect support surface 16 from machining tool 12, such as by being thick enough and/or strong enough to prevent machining tool 12 from contacting and/or damaging support surface 16. Thermal conductive sacrificial material 44 may be sized and shaped to underlie some or all of first surface 20 or second surface 22 of chilled workpiece 14. In other words, the surface area of thermal conductive sacrificial material 44 may be larger than the surface area (or footprint) of chilled workpiece 14 in some examples. In other examples, the footprint of thermal conductive sacrificial material 44 may be smaller than that of chilled workpiece 14. In some examples, a plurality of pieces of thermal conductive sacrificial material 44 may be positioned between chilled workpiece 14 and support surface 16, which may be stacked in layers and/or spaced apart across the surface of support surface 16.

Vacuum system 38 may be configured to secure thermal conductive sacrificial material 44 to support surface 16 during machining of chilled workpiece 14. In some examples, thermal conductive sacrificial material 44 may include perforations, or vacuum ports, 46 such that vacuum system 38 draws a vacuum through perforations 46, thereby securing chilled workpiece 14 to thermal conductive sacrificial material 44 when chilled workpiece 14 is placed on thermal conductive sacrificial material 44. Additionally or alternatively to thermal conductive sacrificial material 44, chilled workpiece 14 may include one or more reliefs 52 that prevent machining tool 12 from impacting support surface 16 during machining of chilled workpiece 14.

Chilled workpiece 14 generally takes the form of a sheet material 56, though other shapes and sizes of chilled workpiece 14 are also within the scope of the present disclosure. Specific examples of sheet material 56 that may form chilled workpiece 14 include polymer-reinforced fibers, such as polymer-reinforced carbon fiber and/or fiberglass materials. In a specific example, chilled workpiece 14 may be a panel for an aircraft that is formed of a plurality of layers (plys) of material laid up together to form the panel. Chilled workpiece 14 may include sacrificial material adhered to, coupled to, or integrally formed with the sheet material.

Adhesive 24 may be pre-bonded to sheet material 56 of chilled workpiece 14 in some examples. In other examples, adhesive 24 may be applied to sheet material 56 just before machining chilled workpiece 14 using machining apparatus 10. Machining apparatus 10 may be a standalone machining apparatus in some examples, with a modular or integrated cooling system 18. Additionally or alternatively, machining apparatus 10 may be formed by retrofitting an existing machine with cooling system 18 according to the present disclosure.

Figure 3:
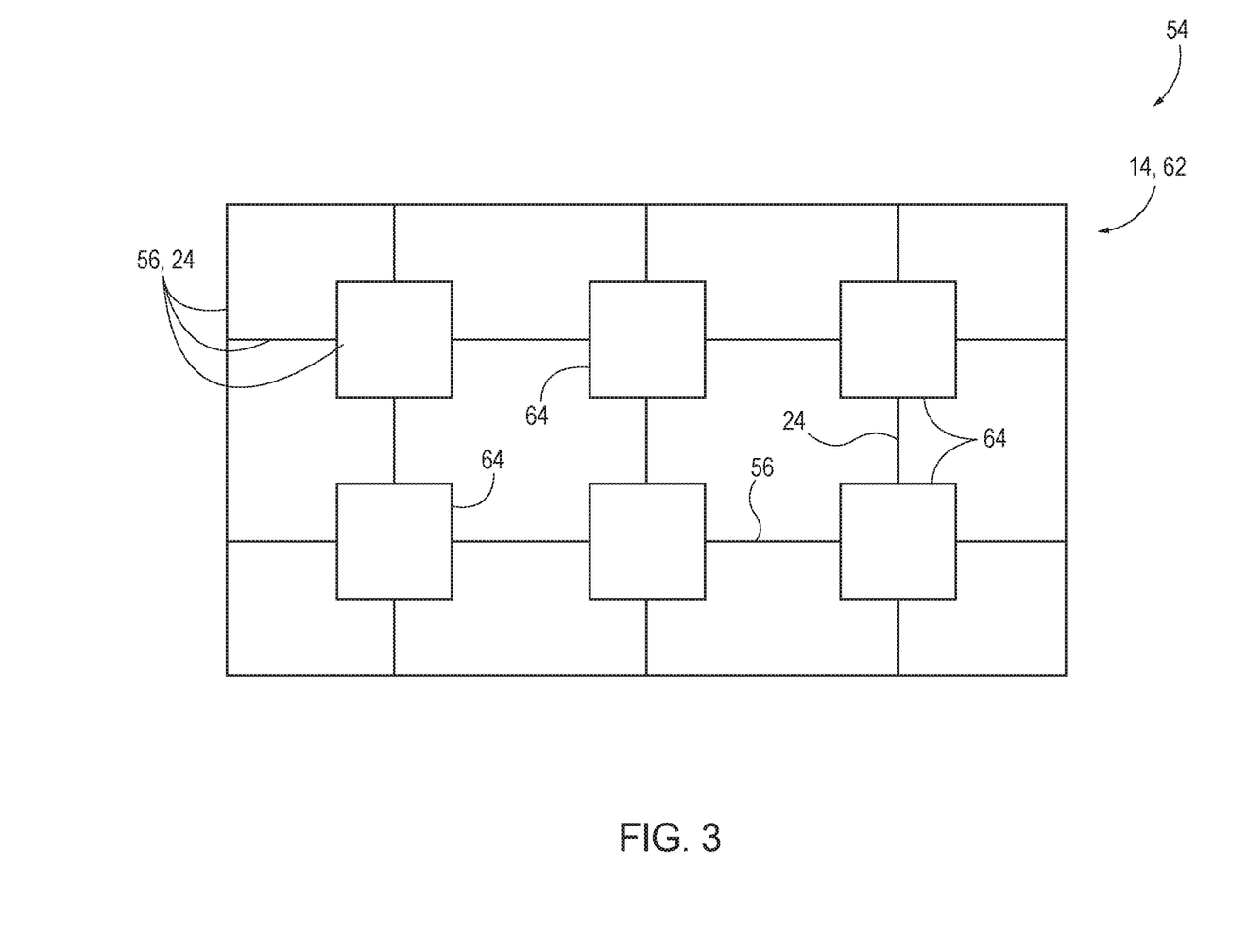
FIG. 3 is a schematic representation illustrating examples of kits according to the present disclosure.

FIG. 3 schematically represents examples of kits 54 according to the present disclosure. Kits 54 include sheet material 56 and adhesive 24 coupled to a first surface 58 and/or a second surface 60 of sheet material 56, to form workpiece 62 (which is an example of chilled workpiece 14). Workpiece 62 is chilled to a temperature below the curing temperature of adhesive 24. Each of a plurality of parts 64 is pre-formed in sheet material 56 such that respective parts 64 are connected together by segments of sheet material 56 and/or adhesive 24 such that the respective parts 64 are selectively removable from kit 54 by breaking apart the respective part 64 from the other parts 64 formed in sheet material 56. In a specific example, parts 64 are a plurality of shims for an aircraft structure. Parts 64 may be cut to fit a specific as-built gap in an aircraft assembly.

Figure 4:
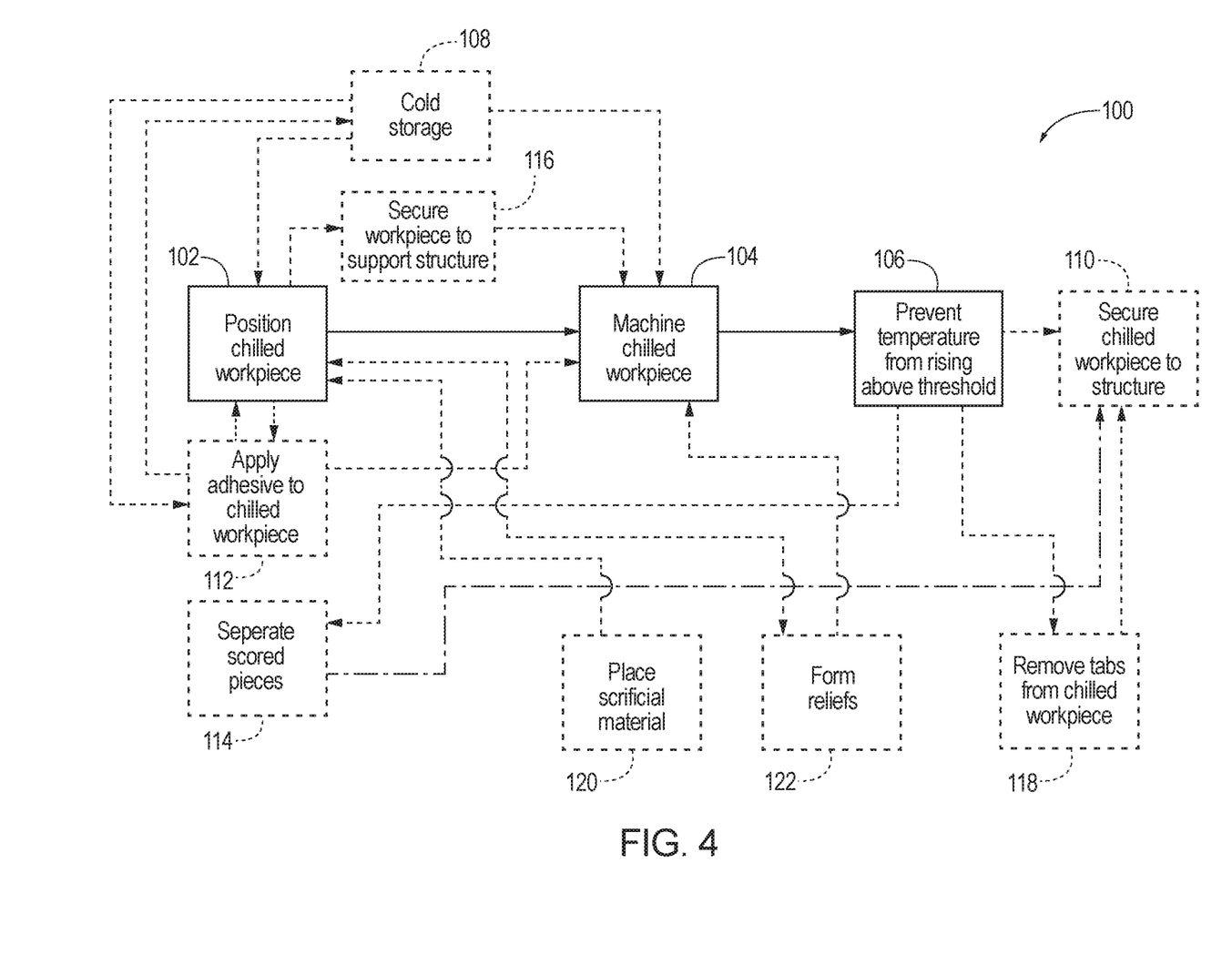
FIG. 4 is a flowchart schematically representing methods of machining workpieces according to the present disclosure.

FIG. 4 schematically provides a flowchart that represents illustrative, non-exclusive examples of methods 100 of machining a chilled workpiece (e.g., chilled workpiece 14) according to the present disclosure. In FIG. 4, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 4 are not limiting and other methods and steps are within the scope of the present disclosure, including methods having greater than or fewer than the number of steps illustrated, as understood from the discussions herein.

Methods 100 generally include positioning the chilled workpiece such that it is supported by a support surface of a machining apparatus (e.g., support surface 16 of machining apparatus 10) at 102, machining the chilled workpiece via a machining tool (e.g., machining tool 12) while the chilled workpiece is supported by the support surface, at 104, and preventing the machining temperature of an adhesive of the chilled workpiece (e.g., adhesive 24) from rising above a predetermined threshold temperature during machining of the chilled workpiece, at 106. Said preventing at 106 is effectuated by a cooling system of the machining apparatus (e.g., cooling system 18). For example, preventing at 106 may include flowing cooling fluid (e.g., cooling fluid 26) through one or more fluid channels (e.g., fluid channels 45) positioned relative to the support surface such that the cooling fluid cools the chilled workpiece or maintains the temperature of the chilled workpiece.

Said predetermined threshold temperature generally is determined at least partially based on a curing temperature of the adhesive, such that the cooling system of the machining apparatus keeps the chilled workpiece and adhesive at a temperature low enough that the adhesive does not start to cure during machining of the chilled workpiece. The predetermined threshold temperature may be at least 10° F. below the curing temperature of the adhesive, at least 20° F. below the curing temperature, at least 30° F. below the curing temperature, at least 40° F. below the curing temperature, at least 50° F. below the curing temperature, at least 60° F. below the curing temperature, at least 70° F. below the curing temperature, at least 80° F. below the curing temperature, at least 90° F. below the curing temperature, and/or at least 100° F. below the curing temperature.

The machining at 104 may include cutting the chilled workpiece, such as via a laser cutter, a water jet cutter, a cryogenic cutter, and/or a liquid Nitrogen cutter. In examples wherein the machining at 104 includes cutting the chilled workpiece, the machining tool may be configured to cut through the entire sheet material and/or entirely through the adhesive. In some examples, machining at 104 includes cutting only partially through the sheet material and/or only partially through the adhesive. For example, machining at 104 may include scoring the adhesive and/or the sheet material, such as to score a plurality of respective shapes or parts into the chilled workpiece, which may then later be selectively removed or separated from one another at 114. In a specific example, machining at 104 includes profiling a plurality of specific pieces in the chilled workpiece, in a real-time, as-needed basis. Additionally or alternatively, machining at 104 may include milling, drilling, turning, trimming, facing, smoothing, grinding, broaching, honing, reaming, shaping, threading, tapping, boring, planing, and/or any other machining operations. Machining at 104 is performed on both the sheet material and the adhesive together (e.g., after the adhesive is applied to the sheet material). Machining at 104 may be automated, such as by a numerically controlled machining apparatus.

Some methods 100 include storing the adhesive and/or the chilled workpiece in cold storage at 108 before the machining at 104. Additionally or alternatively, the chilled workpiece may be stored in cold storage at 108 after the machining 104, such as until a time that the chilled workpiece will be secured to another structure (e.g., by adhering the chilled workpiece to the structure by curing the adhesive). Furthermore, methods 100 may include securing the chilled workpiece to a structure at 110, after the machining at 104. In some examples, securing the chilled workpiece to the structure (e.g., an aircraft structure such as aircraft wing assembly) at 110 includes applying pressure and/or heat to the chilled workpiece as it is being secured to the structure. Securing the chilled workpiece to the structure at 110 may be performed without storing the chilled workpiece between the machining at 104 and the securing at 110. Thus, some examples of methods 100 may be LEAN manufacturing methods configured to reduce storage requirements and/or waste.

In some examples, methods 100 include applying the adhesive (e.g., a film adhesive) at 112 to the first surface and/or second surface of the chilled workpiece (e.g., first surface 20 and/or second surface 22) of a sheet material. Such applying the adhesive at 112 may be performed before or after the positioning at 102 with respect to the support surface. Positioning the chilled workpiece at 102 may include positioning the chilled workpiece such that the adhesive faces and/or contacts the support surface, and/or positioning the chilled workpiece such that the adhesive faces away from the support surface.

Methods 100 may include securing the chilled workpiece with respect to the support surface at 116, such that the chilled workpiece is substantially prevented from moving during machining at 104. For example, securing at 116 may include securing the chilled workpiece via a vacuum system (e.g., vacuum system 38) drawing the chilled workpiece against the support surface and/or securing the chilled workpiece via a clamping mechanism (e.g., clamping mechanism 42) that secures the chilled workpiece with respect to the support surface. Some methods 100 include removing one or more tabs (e.g., tabs 48) from a perimeter of the chilled workpiece, at 118. Said tabs may be used to secure the chilled workpiece, such as by clamping onto the tabs using a clamping mechanism. Said removing at 118 is performed after the machining at 104.

In some examples, method 100 includes positioning or placing a thermal conductive sacrificial material (e.g., thermal conductive sacrificial material 44) on the support surface at 120, with the thermal conductive sacrificial material being configured to protect the support surface during the machining the chilled workpiece. Such thermal conductive sacrificial material may be configured and positioned such that it prevents the machining tool from contacting the support surface. Placing the sacrificial material at 120 may also include securing it to the support surface, such as via a vacuum system. Additionally or alternatively, methods 100 may include forming one or more reliefs (e.g., relief 52) into the chilled workpiece at 122, with the one or more reliefs being sized, shaped, and positioned to prevent the machining tool from contacting the support surface during the machining the chilled workpiece.

Illustrative, non-exclusive examples of inventive subject matter according to the present disclosure are described in the following enumerated paragraphs:

A1. A machining apparatus, comprising:
a machining tool for machining a chilled workpiece;
a support surface for supporting the chilled workpiece during machining by the machining tool; and
a cooling system operatively coupled to the support surface such that the cooling system prevents a machining temperature of an adhesive coupled to the chilled workpiece from rising beyond a predetermined threshold temperature during machining of the chilled workpiece, such that the cooling system prevents curing of the adhesive during machining of the chilled workpiece, wherein the cooling system comprises a cooling fluid that radiantly cools the chilled workpiece via the support surface while the chilled workpiece is supported by the support surface, and wherein the cooling system maintains the machining temperature of the chilled workpiece below an ambient temperature.

A1.1 Wherein the machining tool is a cutting mechanism for cutting the chilled workpiece.

A2. The machining apparatus of paragraph A1.1, wherein the cutting mechanism comprises a laser cutter.

A3. The machining apparatus of any of paragraphs A1.1-A2, wherein the cutting mechanism is numerically controlled (NC).

A4. The machining apparatus of any of paragraphs A1.1-A3, wherein the cutting mechanism is automated.

A5. The machining apparatus of any of paragraphs A1.1-A4, wherein the cutting mechanism comprises a water jet cutter.

A6. The machining apparatus of any of paragraphs A1.1-A5, wherein the cutting mechanism comprises a liquid nitrogen jet cutter.

A7. The machining apparatus of any of paragraphs A1.1-A6, wherein the cutting mechanism comprises a cryogenic cooling fluid.

A7.1. The machining apparatus of any of paragraphs A1.1-A7, wherein the cutting mechanism comprises a cryogenic cutter.

A7.2. The machining apparatus of any of paragraphs A1.1-A7.1, wherein the cutting mechanism comprises a blade cutter.

A7.3. The machining apparatus of any of paragraphs A1-A7.2, wherein the machining tool comprises a cutting mechanism, a laser cutter, a water jet cutter, a blade cutter, a liquid nitrogen jet cutter.

A7.4 The machining apparatus of paragraph A7.3, wherein the cutting mechanism comprises a cryogenic cooling fluid and/or a cryogenic cutter.

A7.5 The machining apparatus of any of paragraphs A1-A7.4, wherein the machining tool comprises a broaching machine, a drill, a hone, a lathe, a mill, a shaper, a planer, a grinding machine, a multitasking machine tool, a welding head, a laser welder, and/or a paint spray gun.

A8. The machining apparatus of any of paragraphs A1-A7.5, wherein the cooling system is configured to selectively increase or decrease a temperature of the support surface and/or a temperature of the chilled workpiece.

A9. The machining apparatus of any of paragraphs A1-A8, wherein the cooling system is configured to selectively control a respective temperature of a plurality of respective zones of the support surface independently of one another.

A10. The machining apparatus of any of paragraphs A1-A9, wherein the machining apparatus further comprises one or more temperature sensors configured to provide feedback including temperature information during machining of the chilled workpiece.

A10.1. The machining apparatus of paragraph A10, wherein at least one of the one or more temperature sensors comprises a thermocouple.

A11. The machining apparatus of any of paragraphs A1-A10.1, wherein the machining apparatus is configured such that the support surface selectively increases or decreases in temperature in response to feedback from one or more temperature sensors operatively coupled to the support surface and/or to the chilled workpiece.

A12. The machining apparatus of any of paragraphs A1-A11, wherein the machining apparatus keeps the chilled workpiece below a temperature of 150° F., 140° F., 130° F., 120° F., 110° F., 100° F., 90° F., 80° F., 70° F., 60° F., 50° F., 40° F., and/or 30° F. during machining of the chilled workpiece.

A13. The machining apparatus of any of paragraphs A1-A12, wherein the support surface is configured to support an adhesive side of the chilled workpiece.

A14. The machining apparatus of any of paragraphs A1-A13, wherein the support surface is configured to support a non-adhesive side of the chilled workpiece.

A15. The machining apparatus of any of paragraphs A1-A14, wherein the cooling system comprises a liquid cooling bath.

A16. The machining apparatus of any of paragraphs A1-A15, wherein the cooling system is configured to reduce the temperature of the chilled workpiece.

A17. The machining apparatus of any of paragraphs A1-A16, wherein the cooling system is configured to maintain the temperature of the chilled workpiece below an ambient temperature.

A18. The machining apparatus of any of paragraphs A1-A17, wherein the cooling system comprises a cooling bed.

A19. The machining apparatus of paragraph A18, wherein the support surface comprises a plurality of perforations, wherein the machining apparatus further comprises a vacuum system, and wherein the vacuum system is operatively coupled to the support surface via the plurality of perforations to secure the chilled workpiece to the support surface during machining of the chilled workpiece.

A20. The machining apparatus of any of paragraphs A1-A19, further comprising a mechanical clamping mechanism configured to secure the chilled workpiece to the support surface during machining of the chilled workpiece.

A21. The machining apparatus of any of paragraphs A1-A20, wherein the machining apparatus comprises a CNC mill table, and wherein the support surface forms a portion of the CNC mill table.

A22. The machining apparatus of paragraph A21, wherein the cooling fluid flows through the CNC mill table.

A23. The machining apparatus of any of paragraphs A1-A22, wherein the cooling fluid comprises water, liquid nitrogen, and/or a refrigerant.

A24. The machining apparatus of any of paragraphs A1-A23, wherein the cooling fluid flows beneath the support surface.

A25. The machining apparatus of any of paragraphs A1-A24, wherein the cooling system comprises one or more fluid channels for flowing the cooling fluid, wherein the fluid channels are positioned relative to the support surface such that the cooling fluid cools the support surface and the chilled workpiece, when the chilled workpiece is positioned on the support surface.

A26. The machining apparatus of any of paragraphs A1-A25, further comprising a thermal conductive sacrificial material positioned between the support surface and the chilled workpiece, when the chilled workpiece is supported by the support surface.

A27. The machining apparatus of paragraph A26, wherein the thermal conductive sacrificial material is configured to protect the support surface during machining of the chilled workpiece.

A28. The machining apparatus of any of paragraphs A26-A27, wherein the machining apparatus comprises a/the vacuum system that secures the thermal conductive sacrificial material to the support surface during machining of the chilled workpiece.

A29. The machining apparatus of paragraph A28, wherein the thermal conductive sacrificial material comprises one or more vacuum ports such that the vacuum system secures the chilled workpiece to the thermal conductive sacrificial material via the one or more vacuum ports.

B1. A system, comprising:
the machining apparatus of any of paragraphs A1-A29; and
the chilled workpiece, wherein the chilled workpiece comprises a sheet material having a first surface and a second surface opposite the first surface, and wherein the adhesive is coupled to the first surface and/or the second surface of the sheet material.

B2. The system of paragraph B1, wherein the adhesive is a temperature-sensitive adhesive.

B3. The system of any of paragraphs B1-B2, wherein the adhesive is a film adhesive.

B4. The system of any of paragraphs B1-B3, wherein the adhesive is configured to cure at a temperature below 80° F., wherein the adhesive is configured to cure at a temperature between 80° F. and 100° F., wherein the adhesive is configured to cure at a temperature between 100° F. and 120° F., wherein the adhesive is configured to cure at a temperature between 120° F. and 140° F., wherein the adhesive is configured to cure at a temperature between 140° F. and 160° F., or wherein the adhesive is configured to cure at a temperature between 160° F. and 180° F.

B5. The system of any of paragraphs B1-B4, wherein the sheet material comprises fiberglass or carbon fiber.

B6. The system of any of paragraphs B1-B5, wherein the adhesive is configured for cold storage.

B7. The system of any of paragraphs B1-B6, wherein the first surface is a/the adhesive surface.

B8. The system of any of paragraphs B1-B6, wherein the first surface is a/the non-adhesive surface.

B9. The system of any of paragraphs B1-B8, wherein the second surface is a/the adhesive surface.

B10. The system of any of paragraphs B1-B9, wherein the second surface is a/the non-adhesive surface.

B11. The system of any of paragraphs B1-10, wherein the adhesive comprises polycarbonate film adhesive, epoxy film adhesive, cyanate ester film adhesive, polyimide film adhesive, bismaleimide film adhesive, and/or phenolic film adhesive.

B12. The system of any of paragraphs B1-B11, wherein the chilled workpiece has a chilled temperature that is below an ambient temperature.

B13. The system of paragraph B12, wherein the chilled temperature is below 150° F., 140° F., 130° F., 120° F., 110° F., 100° F., 90° F., 80° F., 70° F., 60° F., 50° F., 40° F., and/or 30° F.

B14. The system of any of paragraphs B1-B13, wherein the sheet material comprises a sacrificial material.

B15. The system of any of paragraphs B1-B14, wherein the adhesive is pre-bonded to the sheet material prior to machining the chilled workpiece.

B16. The system of any of paragraphs B1-B15, wherein the chilled workpiece comprises a plurality of tabs positioned around a perimeter of the chilled workpiece, wherein the plurality of tabs is each configured to be selectively removable after machining the chilled workpiece.

B17. The system of paragraph B16, wherein the plurality of tabs together are configured to secure the chilled workpiece with respect to the machining apparatus during machining.

B18. The system of any of paragraphs B1-B17, wherein the chilled workpiece comprises one or more reliefs, wherein the one or more reliefs prevent the machining tool from impacting the support surface during machining of the chilled workpiece.

C1. A kit, comprising:
a sheet material having a first surface and a second surface opposite the first surface;
an adhesive coupled to the first surface and/or the second surface, wherein the adhesive is configured to cure at a curing temperature, wherein the kit is chilled such that it is below the curing temperature, wherein a plurality of parts is each formed in the sheet material such that respective parts are connected together by the sheet material and/or the adhesive, and wherein each respective part is configured to be selectively removable from the kit by breaking apart the respective part from the other parts formed in the sheet material.

C2. The kit of paragraph C1, wherein the adhesive is a film adhesive.

C3. The kit of any of paragraphs C1-C2, wherein the adhesive comprises polycarbonate film adhesive, epoxy film adhesive, cyanate ester film adhesive, polyimide film adhesive, bismaleimide film adhesive, and/or phenolic film adhesive.

C4. The kit of any of paragraphs C1-C3, wherein the plurality of parts comprises a plurality of shims for an aircraft structure.

C5. The kit of any of paragraphs C1-C4, wherein each respective part of the plurality of parts is cut to fit a specific as-built gap in an aircraft wing assembly.

D1. A method, comprising:
positioning a chilled workpiece such that it is supported by a support surface of a machining apparatus, wherein the chilled workpiece comprises a sheet material having a first surface and a second surface opposite the first surface, wherein an adhesive is coupled to the first surface and/or the second surface of the sheet material, wherein the support surface supports the chilled workpiece during machining by a machining tool of the machining apparatus, and wherein the machining apparatus comprises a cooling system operatively coupled to the support surface such that the cooling system prevents a machining temperature of the adhesive from rising beyond a predetermined threshold temperature during machining of the chilled workpiece, and such that the cooling system is configured to prevent curing of the adhesive during machining of the chilled workpiece;
machining the chilled workpiece via the machining tool while the chilled workpiece is supported by the support surface; and
preventing the machining temperature of the adhesive is from rising above the predetermined threshold temperature during machining, via the cooling system.

D2. The method of paragraph D1, wherein the machining apparatus is the machining apparatus of any of paragraphs A1-A29.

D3. The method of any of paragraphs D1-D2, wherein the predetermined threshold temperature is based on a curing temperature at which the adhesive is configured to cure.

D4. The method of paragraph D3, wherein the predetermined threshold temperature is at least 10° F. below the curing temperature, at least 20° F. below the curing temperature, at least 30° F. below the curing temperature, at least 40° F. below the curing temperature, at least 50° F. below the curing temperature, at least 60° F. below the curing temperature, at least 70° F. below the curing temperature, at least 80° F. below the curing temperature, at least 90° F. below the curing temperature, and/or at least 100° F. below the curing temperature.

D5. The method of any of paragraphs D1-D4, wherein the adhesive comprises a film adhesive.

D6. The method of any of paragraphs D1-D5, wherein the adhesive comprises polycarbonate film adhesive, epoxy film adhesive, cyanate ester film adhesive, polyimide film adhesive, bismaleimide film adhesive, and/or phenolic film adhesive.

D7. The method of any of paragraphs D1-D6, wherein the adhesive is configured to cure at a temperature below 80° F., wherein the adhesive is configured to cure at a temperature between 80° F. and 100° F., wherein the adhesive is configured to cure at a temperature between 100° F. and 120° F., wherein the adhesive is configured to cure at a temperature between 120° F. and 140° F., wherein the adhesive is configured to cure at a temperature between 140° F. and 160° F., or wherein the adhesive is configured to cure at a temperature between 160° F. and 180° F.

D8. The method of any of paragraphs D1-D7, wherein the sheet material comprises fiberglass or carbon fiber.

D9. The method of any of paragraphs D1-D8, wherein the adhesive is configured for cold storage, and wherein the method further comprises storing the adhesive in cold storage prior to the positioning the chilled workpiece.

D10. The method of any of paragraphs D1-D9, further comprising storing the chilled workpiece in cold storage after the machining the chilled workpiece.

D11. The method of any of paragraphs D1-D10, further comprising securing the chilled workpiece to a structure after the machining the chilled workpiece.

D11.1. The method of paragraph D11, wherein the securing comprises applying pressure and/or heat to the chilled workpiece as it is being secured to the structure.

D11.2. The method of paragraph D11 or D11.1., wherein the structure is an aircraft structure.

D11.3. The method of any of paragraphs D11-D11.2, wherein the securing comprises securing the chilled workpiece without storing the chilled workpiece between the machining and the securing.

D11.4. The method of any of paragraphs D11-D11.3, wherein the method is a LEAN manufacturing process.

D12. The method of any of paragraphs D1-D11.4, further comprising storing the chilled workpiece in cold storage prior to the positioning the chilled workpiece.

D13. The method of any of paragraphs D1-D12, further comprising applying the adhesive to the first surface and/or to the second surface of the sheet material.

D14. The method of paragraph D13, wherein the applying the adhesive is performed before the positioning the chilled workpiece.

D15. The method of paragraph D13, wherein the applying the adhesive is performed after the positioning the chilled workpiece.

D16. The method of any of paragraphs D13-D15, wherein the applying the adhesive comprises applying a sheet of film adhesive.

D17. The method of any of paragraphs D1-D16, wherein the machining is automated.

D18. The method of any of paragraphs D1-D17, wherein the machining comprises cutting the chilled workpiece.

D18.1 The method of any of paragraphs D1-D18, wherein the machining comprises laser cutting, water jet cutting, and/or liquid nitrogen cutting.

D19. The method of any of paragraphs D1-D18.1, wherein the machining tool is numerically controlled.

D20. The method of any of paragraphs D1-D19, wherein the machining comprises cutting entirely through the sheet material.

D21. The method of any of paragraphs D1-D20, wherein the machining comprises cutting entirely through the adhesive.

D22. The method of any of paragraphs D1-D20, wherein the machining comprises cutting only partially through the adhesive.

D23. The method of any of paragraphs D1-D22, wherein the machining comprises scoring the sheet material and/or the adhesive.

D24. The method of any of paragraphs D1-D22, wherein the machining comprises scoring a plurality of respective shapes into the chilled workpiece.

D24.1. The method of any of paragraphs D1-D22, wherein the machining comprises milling, drilling, turning, trimming, facing, smoothing, grinding, broaching, honing, reaming, shaping, threading, tapping, boring, planing, and/or any other machining operations.

D25. The method of paragraph D24.1, further comprising separating the plurality of respective shapes from each other.

D26. The method of any of paragraphs D1-D25, wherein the machining comprises cutting the sheet material and the adhesive together.

D27. The method of any of paragraphs D1-D26, wherein the machining comprises profiling a plurality of respective pieces in real-time, as needed.

D28. The method of any of paragraphs D1-D27, further comprising securing the chilled workpiece to the support surface such that the chilled workpiece is prevented from moving during the machining.

D29. The method of paragraph D28, wherein the securing comprises applying a vacuum to secure the chilled workpiece to the support surface.

D30. The method of any of paragraphs D28-D29, wherein the securing comprises clamping the chilled workpiece with respect to the support surface.

D31. The method of any of paragraphs D1-D30, wherein the positioning comprises positioning the chilled workpiece such that the adhesive faces and/or contacts the support surface.

D32. The method of any of paragraphs D1-D31, wherein the positioning comprises positioning the chilled workpiece such that the adhesive faces out from the support surface.

D33. The method of any of paragraphs D1-D32, further comprising removing one or more tabs from a/the perimeter of the chilled workpiece, after the machining.

D34. The method of any of paragraphs D1-D33, wherein the preventing comprises flowing cooling fluid through one or more fluid channels positioned relative to the support surface such that the cooling fluid cools the chilled workpiece or maintains a temperature of the chilled workpiece.

D35. The method of any of paragraphs D1-D34, further comprising placing a thermal conductive sacrificial material on the support surface, wherein the thermal conductive sacrificial material is configured to protect the support surface during the machining the chilled workpiece.

D36. The method of paragraph D35, wherein the thermal conductive sacrificial material prevents the machining tool from contacting the support surface.

D37. The method of any of paragraphs D35-D36, further comprising securing the thermal conductive sacrificial material to the support surface using a/the vacuum system of the machining apparatus.

D38. The method of any of paragraphs D1-D37, further comprising forming one or more reliefs in the chilled workpiece, wherein the one or more reliefs prevent the machining tool from contacting the support surface during the machining the chilled workpiece.

E1. The use of the machining apparatus of any of paragraphs A1-A29 and/or the system of any of paragraphs B1-B18 to cut the chilled workpiece.

E2. The use of the machining apparatus of any of paragraphs A1-A29 and/or the system of any of paragraphs B1-B18 to machine one or more shims for an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatus, systems, and steps of methods disclosed herein are not required to all apparatus, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatus, systems, and methods that are expressly disclosed herein, and such inventive subject matter may find utility in apparatus, systems, and/or methods that are not expressly disclosed herein.

The invention claimed is:

1. A machining apparatus, comprising:
a machining tool for machining a chilled workpiece, wherein the machining tool is numerically controlled, wherein the chilled workpiece comprises a sheet material having a first surface and a second surface opposite the first surface, and wherein the machining tool is configured to machine the sheet material and a curable adhesive together;
a support surface for supporting the chilled workpiece during machining by the machining tool; and
a cooling system operatively coupled to the support surface such that the cooling system prevents a machining temperature of the curable adhesive coupled to at least the first surface of the sheet material of the chilled workpiece from rising beyond a predetermined threshold temperature during machining of the chilled workpiece, such that the cooling system prevents curing of the curable adhesive during machining of the chilled workpiece, wherein the cooling system comprises a cooling fluid that radiantly cools the chilled workpiece via the support surface while the chilled workpiece is supported by the support surface, and wherein the cooling system maintains the machining temperature of the curable adhesive below an ambient temperature.

2. The machining apparatus according to claim 1, wherein the machining tool comprises a cryogenic cooling fluid cutting mechanism.

3. The machining apparatus according to claim 1, wherein the cooling system is configured to selectively increase or decrease in temperature.

4. The machining apparatus according to claim 1, wherein the cooling system is configured to selectively control a respective temperature of a plurality of respective zones of the support surface independently of one another.

5. The machining apparatus according to claim 1, wherein the machining apparatus further comprises one or more temperature sensors operatively coupled to the chilled workpiece and configured to provide feedback including temperature information during machining of the chilled workpiece and the curable adhesive, and wherein the machining apparatus is configured such that the support surface selectively increases or decreases in temperature in response to feedback from the one or more temperature sensors.

6. The machining apparatus according to claim 1, wherein the machining apparatus is configured to keep the chilled workpiece below a temperature of 80° F. during machining of the chilled workpiece.

7. The machining apparatus according to claim 1, wherein the support surface comprises a plurality of perforations, wherein the machining apparatus further comprises a vacuum system, and wherein the vacuum system is operatively coupled to the support surface via the plurality of perforations to secure the chilled workpiece to the support surface during machining of the chilled workpiece.

8. The machining apparatus according to claim 1, further comprising a mechanical clamping mechanism configured to secure the chilled workpiece to the support surface during machining of the chilled workpiece and the curable adhesive.

9. A system, comprising:
the machining apparatus according to claim 1; and
the chilled workpiece, wherein the curable adhesive is a temperature-sensitive film adhesive, wherein the chilled workpiece has a chilled temperature that is below the ambient temperature.

10. The system according to claim 9, wherein the curable adhesive is pre-bonded to the sheet material prior to machining of the chilled workpiece.

11. The system according to claim 9, wherein the chilled workpiece comprises a plurality of tabs positioned around a perimeter of the chilled workpiece, wherein each tab of the plurality of tabs is configured to be selectively removable after machining the chilled workpiece and the curable adhesive, and wherein the plurality of tabs are, together, configured to secure the chilled workpiece with respect to the machining apparatus during machining.

12. A method, comprising:
positioning a chilled workpiece such that it is supported by a support surface of a machining apparatus, wherein the chilled workpiece comprises a sheet material having a first surface and a second surface opposite the first surface, wherein a curable adhesive is coupled to at least the first surface of the sheet material, wherein the support surface supports the chilled workpiece during machining by a machining tool of the machining apparatus, and wherein the machining apparatus comprises a cooling system operatively coupled to the support surface such that the support surface prevents a machining temperature of the curable adhesive from rising beyond a predetermined threshold temperature during machining of the chilled workpiece, and such that the cooling system is configured to prevent curing of the curable adhesive during machining of the chilled workpiece;
machining the chilled workpiece via the machining tool while the chilled workpiece is supported by the support surface, wherein the machining comprises machining the sheet material and the curable adhesive together; and
preventing the machining temperature of the curable adhesive from rising above the predetermined threshold temperature during machining, via the cooling system, wherein the cooling system comprises a cooling fluid that radiantly cools the chilled workpiece via the support surface while the chilled workpiece is supported by the support surface.

13. The method according to claim 12, wherein the predetermined threshold temperature is based on a curing temperature at which the curable adhesive is configured to cure, wherein the predetermined threshold temperature is at least 20° F. below the curing temperature.

14. The method according to claim 12, wherein the curable adhesive comprises a curable film adhesive configured to cure at a temperature between 160 and 180 degrees Fahrenheit.

15. The method according to claim 12, further comprising securing the chilled workpiece to a structure after the machining of the chilled workpiece, wherein the securing comprises securing the chilled workpiece without storing the chilled workpiece between the machining and the securing, and wherein the securing comprises applying pressure and heat to the chilled workpiece as it is being secured to the structure.

16. The method according to claim 12, further comprising applying the curable adhesive to the first surface of the sheet material, wherein the applying is performed before the positioning of the chilled workpiece.

17. The method according to claim 12, wherein the machining comprises numerically controlled cutting.

18. The method according to claim 12, wherein the machining comprises scoring a plurality of respective shapes into the chilled workpiece, and wherein the method further comprises separating the plurality of respective shapes from each other.

19. The method according to claim 12, further comprising securing the chilled workpiece to the support surface such that the chilled workpiece is prevented from moving during the machining, wherein the securing comprises applying a vacuum to secure the chilled workpiece to the support surface.

20. The method according to claim 12, further comprising positioning a thermal conductive sacrificial material between the chilled workpiece and the support surface, wherein the thermal conductive sacrificial material prevents the machining tool from contacting the support surface during the machining the chilled workpiece.

* * * * *